(12) United States Patent
Sakurai et al.

(10) Patent No.: US 6,650,213 B1
(45) Date of Patent: Nov. 18, 2003

(54) ELECTROMAGNETIC-INDUCTION COUPLING APPARATUS

(75) Inventors: Yuji Sakurai, Tokyo (JP); Ikuo Nishimoto, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/297,100
(22) PCT Filed: Jun. 2, 2000
(86) PCT No.: PCT/JP00/03613
§ 371 (c)(1), (2), (4) Date: Nov. 29, 2002
(87) PCT Pub. No.: WO01/95432
PCT Pub. Date: Dec. 13, 2001

(51) Int. Cl.$^7$ .............................. H01F 1/00; H01F 47/00
(52) U.S. Cl. ......................... 335/296; 361/139; 361/143
(58) Field of Search ..................................... 335/296, 299; 310/90.5; 361/139, 143, 152, 160, 170, 206, 209, 210

(56) References Cited

U.S. PATENT DOCUMENTS 6,254,548 B1 * 7/2001 Ishikawa et al. ............ 600/549

FOREIGN PATENT DOCUMENTS

| JP | 62-287726 A | 12/1987 |
| JP | 08-087580 A | 4/1996 |
| JP | 10-208163 A | 8/1998 |

* cited by examiner

Primary Examiner—Ramon M. Barrera
(74) Attorney, Agent, or Firm—Frishauf, Holtz, Goodman & Chick, P.C.

(57) ABSTRACT

An electromagnetic-induction coupling apparatus adapted for use as a feeder system for supplying electric power to a spherical semiconductor (10) having a coil (11) on the surface thereof by electromagnetic-induction coupling by means of the coil and/or a data communication system for transferring information signals to and from the spherical semiconductor through the coil. The apparatus comprises a coil array (22) including a plurality of coil elements (21) symmetrically two-dimensionally arranged in the longitudinal and transverse directions, for example, on a given plane, and a magnetic field control element (24) for controlling the respective polarities and phases of magnetic fields generated by means of the individual coil elements of the coil array, thereby changing the respective directions of magnetic fields in a region near the coil array to which the spherical semiconductor is guided. The magnetic field control element drives a plurality of coil elements in phase, thereby generating a magnetic field perpendicular to the coil plane of the coil array, and drives the coil elements in predetermined sets of the coil array out of phase, thereby generating a magnetic field parallel to the coil surface of the coil array or inclined at a given angle to the coil plane.

5 Claims, 8 Drawing Sheets

ANGULAR DEVIATION ($\theta$) OF
BALL SEMICONDUCTOR FROM
COIL PLANE OF COIL ARRAY

FEEDER/DATA COMMUNICATION SYSTEM

ANGLE ($\theta$) BETWEEN MAGNETIC FIELD DIRECTION AND COIL

ELECTROMAGNETIC-INDUCTION COUPLING APPARATUS

This application is a U.S. National Phase Application under 35 USC 371 of International Application PCT/JP00/03613 filed Jun. 2, 2000.

TECHNICAL FIELD

The present invention relates to an electromagnetic-induction coupling apparatus adapted for use as a feeder system for supplying electric power to a spherical semiconductor by electromagnetic-induction coupling with a coil for use as an antenna element on the peripheral surface of the spherical semiconductor by means of the coil and/or a data communication system for transmitting to and receiving information signals from the spherical semiconductor.

BACKGROUND ART

Figure 10:
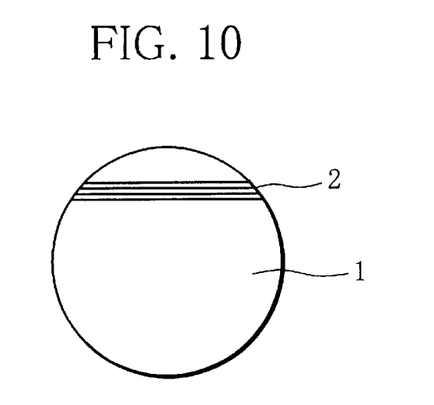
FIG. 10 is a diagram showing the relation between the spherical semiconductor and the coil provided on its surface.

Recently, there have been proposed spherical semiconductors that have functional elements, such as a transistor, sensor, etc., and a semiconductor integrated circuit for predetermined processing functions formed on the surface of a spherical semiconductor chip (ball) with a diameter of about 1 mm. Usually, one such spherical semiconductor comprises a coil (loop antenna) 2 that functions as an antenna element on the surface of a spherical semiconductor chip 1, as shown in FIG. 10. Utilizing electromagnetic-induction coupling by means of a coil 2, the spherical semiconductor is configured to be actuated by external electric power supply and to transmit to and receive information signals from an external apparatus through the coil.

Figure 11:
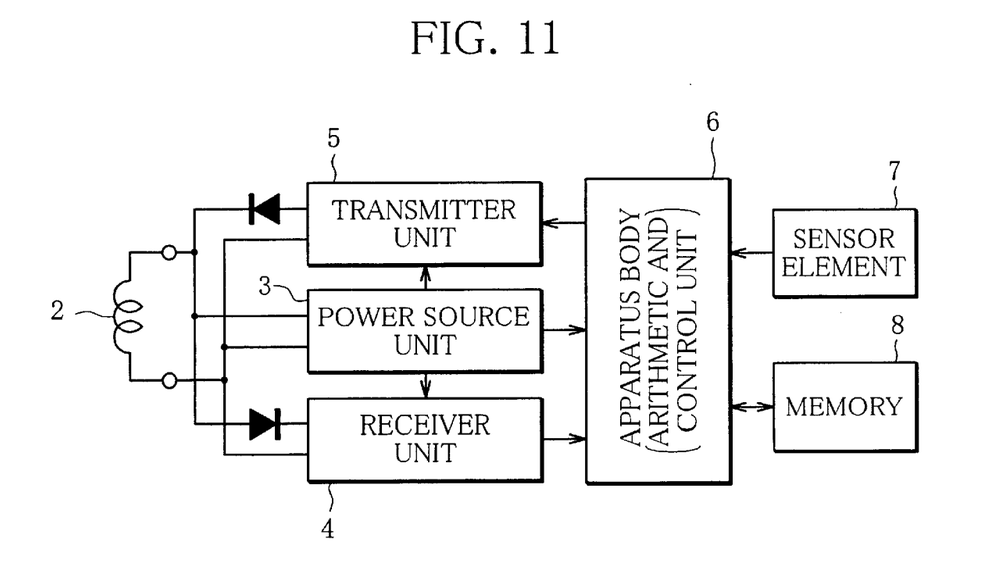
FIG. 11 is a diagram showing an example of a schematic configuration of an integrated circuit attached to the spherical semiconductor.

The integrated circuit that is formed on the semiconductor chip 1 comprises a power source unit 3 that receives electric power (electromagnetic energy) externally fed through the coil 2, thereby forming an internal power source, a receiver unit 4 that receives the information signals from the external apparatus through the coil 2, and a transmitter unit 5 that transmits the information signals to the external apparatus through the coil 2, as shown in FIG. 11, for example. Further, the integrated circuit comprises a sensor unit 7 such as a temperature sensing element, a memory 8, etc., as well as an apparatus body 6 formed of an arithmetic and control unit or the like, and is configured to fulfill given functions based on the operation of the apparatus body 6.

The transmission and reception of the information signals through the coil 2 are carried out by, for example, modulating the information signals with use of an electromagnetic-induction magnetic field for transmitting electric power as a carrier.

Figures 12, 13:
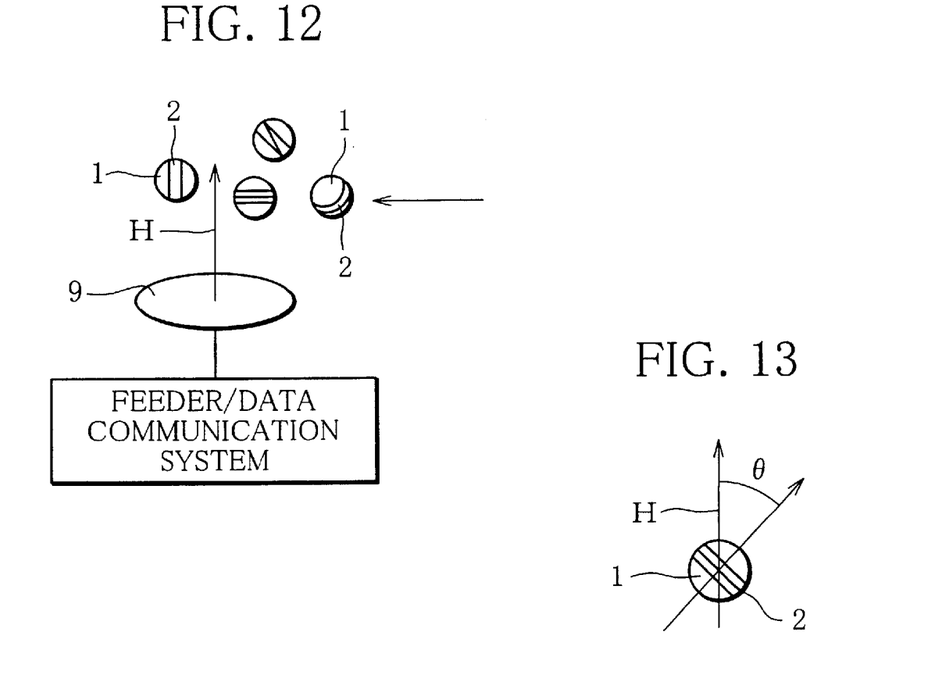
FIG. 12 is a diagram showing the relation between a magnetic field generated by means of a coil of the electromagnetic-induction coupling apparatus and a spherical semiconductor guided to its coupling region.
FIG. 13 is a diagram showing an angular deviation between the direction of the magnetic field in the coupling region and the axial direction of the coil on the spherical semiconductor.

On the other hand, a feeder system for externally supplying electric power to the aforesaid spherical semiconductor by utilizing electromagnetic-induction coupling with the coil 2 and a data communication system for transmitting to and receiving the information signals from the spherical semiconductor through the coil 2 are realized as an electromagnetic-induction coupling apparatus with a coil that forms an electromagnetic-induction magnetic field in a region to which the spherical semiconductor is guided. More specifically, this electromagnetic-induction coupling apparatus (feeder/data communication system) is provided with a coil 9 for use a looped antenna, as shown in FIG. 12, and is configured to form by means of the coil 9 the electromagnetic-induction magnetic field in the region (coupling region) to which the spherical semiconductor is guided.

However, the posture of the spherical semiconductor that is guided to the coupling region near the coil 9 in which the electromagnetic-induction magnetic field is formed by means of the coil 9 is not always uniform, and its direction is generally irregular on account of its spherical shape. As mentioned before, on the other hand, the coupling region to which the spherical semiconductor is guided is located near the coil 9, so that the direction of a magnetic field H in the coupling region is perpendicular to the loop plane of the coil 9. As shown in FIG. 13, therefore, an angular deviation θ is inevitably caused between the direction of the magnetic field H in the coupling region and the axial direction of the coil 2 on the spherical semiconductor.

Figure 14:
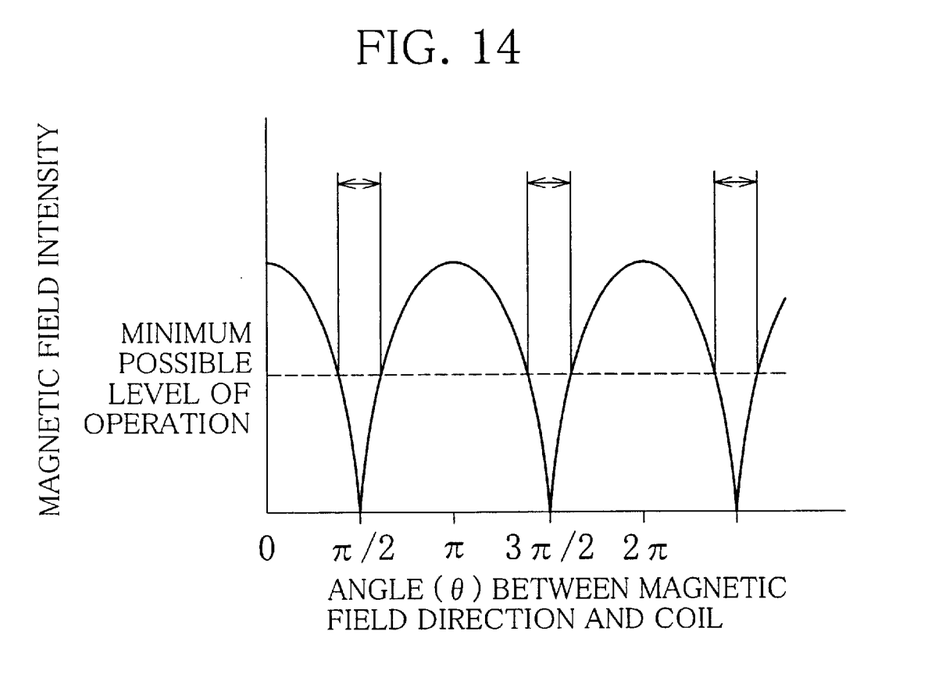
FIG. 14 is a diagram showing the change of the strength of electromagnetic-induction coupling of the spherical semiconductor compared with an angular deviation between the axial direction of the coil on the spherical semiconductor and the magnetic field direction.

This angular deviation θ of the axial direction of the coil 2 from the direction of the magnetic field H causes the strength of coupling between the coil 2 and the magnetic field H, that is, the strength of electromagnetic-induction coupling, to change considerably. If the intensity of the magnetic field generated by means of the coil 9 of the electromagnetic-induction coupling apparatus is fixed, therefore, the intensity of the magnetic field to which the coil 2 of the spherical semiconductor is subjected substantially changes depending on the angular deviation θ, as shown in FIG. 14, for example. Since the electromagnetic-induction coupling with the coil 2 considerably lowers if the axial direction of the coil 2 is deviated by $\pi/2(3\pi/2)$ or thereabout from the direction of the generated magnetic field H, malfunction may occur such that transmission and reception of the information signals are hindered or the aforesaid power supply is interrupted.

DISCLOSURE OF THE INVENTION

The object of the present invention is to provide an electromagnetic-induction coupling apparatus capable of easily effectively obviating the aforesaid malfunction so that electric power supply to a spherical semiconductor and transmission and reception of information signals can be carried out securely.

In other words, the object of the present invention is to an electromagnetic-induction coupling apparatus adapted to realize a feeder system capable of securely supplying electric power to a spherical semiconductor through a coil on the surface of the spherical semiconductor without regard to the posture of the spherical semiconductor, especially the direction of the coil, and/or a data communication system capable of securely transmitting to and receiving information signals from the spherical semiconductor through the coil.

More specifically, an electromagnetic-induction coupling apparatus according to the present invention supplies electric power to a spherical semiconductor having a looped coil on the surface thereof by electromagnetic-induction coupling by means of the coil and/or transfers information signals to and from the spherical semiconductor through the coil.

In order to achieve the above objects, in particular, the apparatus comprises a coil array including a plurality of coil elements two-dimensionally arranged on a given plane, and a magnetic field control element for controlling the respective polarities and phases of magnetic fields generated by means of the individual coil elements of the coil array, thereby changing the respective directions of magnetic fields in a region near the coil array to which the spherical semiconductor is guided.

The control system of the magnetic field control element is constructed so that the directions of the magnetic fields in the region near the coil array to which the spherical semiconductor is guided are successively changed in given cycles. Alternatively, the control system of the magnetic field control element is configured to monitor a response from the spherical semiconductor based on specific information communication and change the directions of the magnetic fields in the region near the coil array to which the spherical semiconductor is guided when no response is obtained from the spherical semiconductor in a given period.

The magnetic field control element drives a plurality of coil elements of the coil array in phase, thereby generating a magnetic field perpendicular to the coil plane of the coil array in the region near the coil array to which the spherical semiconductor is guided. Further, the magnetic field control element drives a plurality of coil elements in predetermined sets of the coil array out of phase, thereby generating a magnetic field parallel to the coil plane of the coil array or inclined at a given angle to the coil plane in the region near the coil array to which the spherical semiconductor is guided.

Preferably, the coil array is realized as a plurality of coil elements symmetrically arranged in the longitudinal and transverse directions on the given plane. The respective polarities and phases of the magnetic fields generated by means of the coil elements that constitute this coil array are individually controlled by means of the aforesaid magnetic field control element, whereby the respective directions of the magnetic fields in the region near the coil array to which the spherical semiconductor is guided are successively changed. Electric power supply and transmission and reception of the information signals can be securely carried out with use of a magnetic field in the direction corresponding to the posture of the spherical semiconductor.

BEST MODE FOR CARRYING OUT THE INVENTION

An electromagnetic-induction coupling apparatus according to one embodiment of the present invention will now be described with reference to the drawings.

Figure 1:
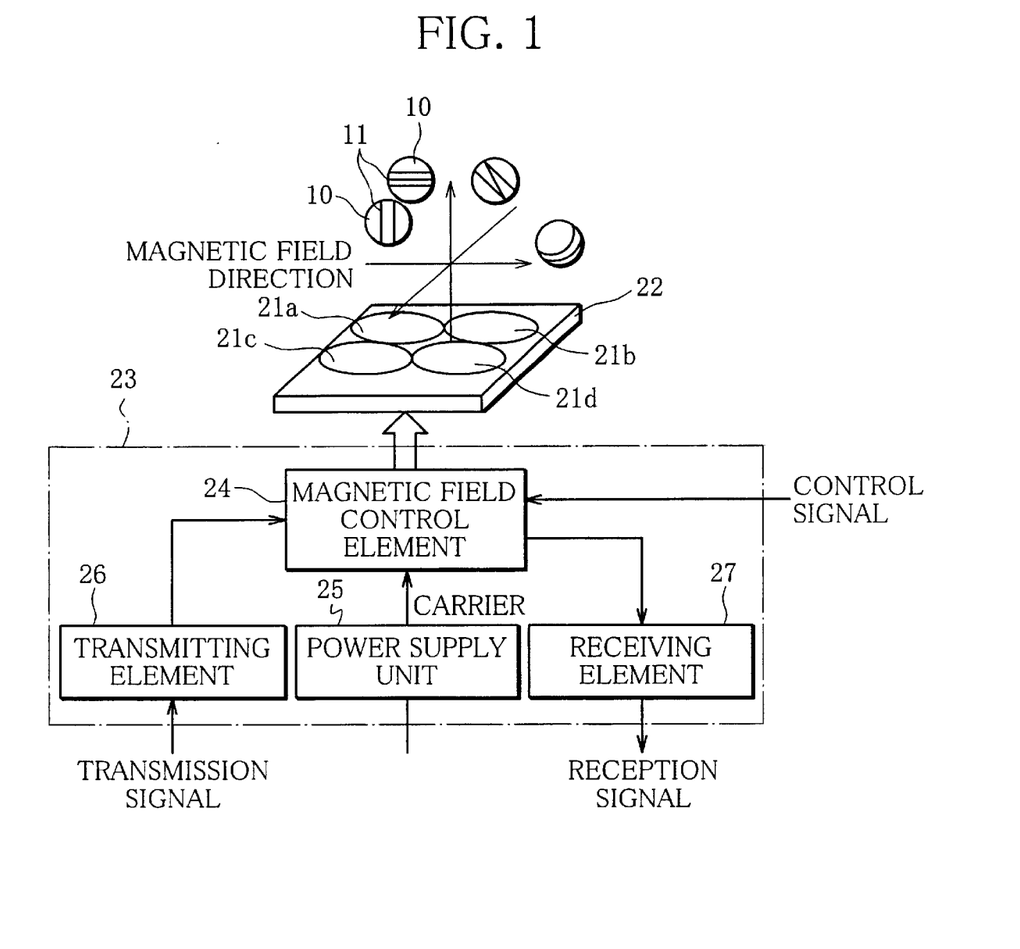
FIG. 1 is a diagram schematically showing an electromagnetic-induction coupling apparatus according to one embodiment of the present invention.

The electromagnetic-induction coupling apparatus realizes a feeder system for feeding electric power to a spherical semiconductor 10, which has a coil 11 on its surface, by electromagnetic-induction coupling by means of the coil 11 and a data communication system for transferring information signals to and from the spherical semiconductor by means of the coil.

As is schematically shown in FIG. 1, the electromagnetic-induction coupling apparatus comprises a coil array 22 formed of a plurality of coil elements 21 that are arranged two-dimensionally on a specific plane. The coil array 22 is realized by two-dimensionally arranging and fixing the coil elements 21, which are formed by coiling a conductor such as an enameled wire for one or several turns, on an insulating flat plate. It is to be understood, in this case, that a protective layer can be provided on the surface of each coil element 21 in order to protect the element against disconnection that is attributable to external contact with foreign substances or the like.

An apparatus body 23 is constructed so as to drive the coil array 22 to form a magnetic field in a region near the coil array 22 to which the spherical semiconductor 10 is guided, supply electric power to the spherical semiconductor 10 by utilizing electromagnetic-induction coupling with the coil 11 in the magnetic field, and transmit to and receive information signals from the spherical semiconductor 10.

More specifically, the apparatus body 23 is provided with a magnetic field control element 24 that controls the polarity and phase of the magnetic field generated by each coil element 21 of the coil array 22, thereby changing the direction of the magnetic field in the region near the coil array 22 to which the spherical semiconductor is guided. Further, the apparatus body 23 is provided with a power supply unit 25 that causes the magnetic field control element 24 to drive the coil array 22 to generate a magnetic field H of a given intensity, and supplies electric power to the spherical semiconductor 10 by using the energy of the magnetic field H. Furthermore, the apparatus body 23 is provided with a data transmitting element 26 and a data receiving element 27 for transmitting to or receiving the information signals from the spherical semiconductor 10. The data transmitting element 26 and the data receiving element 27 are constructed so as to modulate the information signals using the magnetic field H, which is generated by means of the coil array 22, as a carrier as the power supply unit 25 is actuated, for example, thereby transmitting to and receiving the information signals from the spherical semiconductor 10.

Incidentally, carrier signals that are generated by the power supply unit 25 have frequencies of several hundreds of kHz to several hundreds of MHz. Information signals transmitted from the data transmitting element 26 to the spherical semiconductor 10 include, for example, command signals for actuating the spherical semiconductor 10 and error detection signs. Further, information signals transmitted from the spherical semiconductor 10 and received by the data receiving element 27 include response signals for the command signals, measured data obtained by means of the aforementioned sensor element 7, error detection signs, etc. ASK (amplitude shift keying), FSK (frequency shift keying), etc. are suitably used as modulation systems for superposing these information signals on the carrier signals.

The magnetic field control element 24 modulates or amplifies the aforesaid carrier signals and feeds its electric power to the coil array 22, thereby radiating electromagnetic energy from the coil array 22 toward the space. In the magnetic field control element 24, moreover, only electric power energy may be supplied to the spherical semiconductor 10 by outputting unmodulated carrier signals.

The magnetic field control element 24, which fulfills functions characteristic of the electromagnetic-induction coupling apparatus constructed in this manner, serves to control the respective polarities and phases of the magnetic fields generated by the coil elements 21 of the coil array 22, thereby changing the direction of the magnetic field in the region near the coil array 22 to which the spherical semiconductor 10 is guided. More specifically, the coil array 22 is constructed in a manner such that four coil elements 21 (21a, 21b, 21c and 21d), in the form of an annular loop each, for example, are two-dimensionally arranged with their respective flat coil planes (loop planes) flushed so as to be symmetrical in the longitudinal and transverse directions of the coil planes. Basically, the aforesaid magnetic field control element 24 changes the direction of the magnetic field H in the magnetic field formed near the coil array 22 by changing the respective polarities of the magnetic fields generated by the four coil elements 21 (21a, 21b, 21c and 21d).

Figure 2:
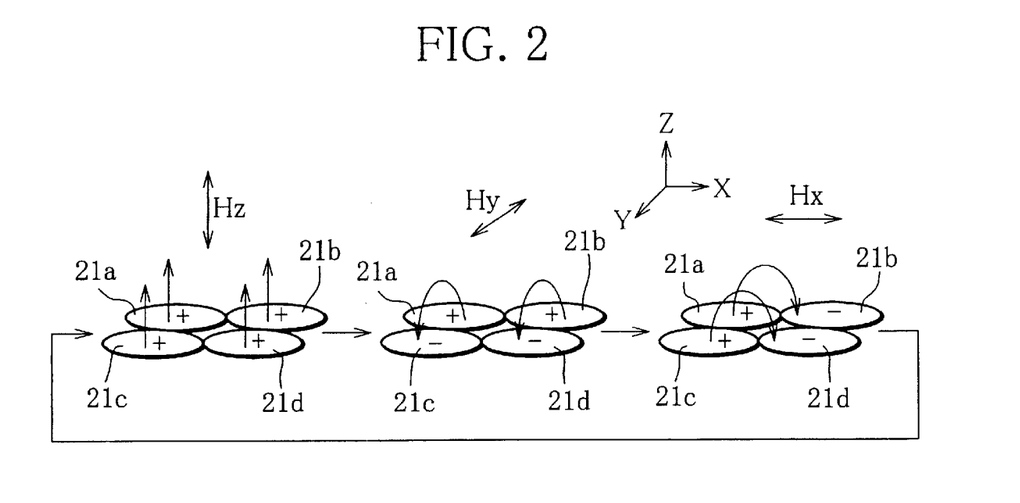
FIG. 2 is a diagram showing the respective polarities of magnetic fields generated by means of a plurality of coil elements constituting a coil array, the respective directions of the magnetic fields in a coupling region, and the way they change.

More specifically, the magnetic field control element 24, of which the concept is shown diametrically in FIG. 2, generates a magnetic field Hz in the Z-axis direction perpendicular to the coil planes in a manner such that all the four coil elements 21 (21a, 21b, 21c and 21d) are driven in phase. The magnetic field control element 24 divides the four coil elements 21 (21a, 21b, 21c and 21d) between a set of coil elements 21a and 21c and a set of coil elements 21b and 21d that adjoin one another in the longitudinal direction (Y-axis direction), and drives the coil elements 21 in each set out of phase. More specifically, in this example, the coil elements 21a and 21b are individually driven in the positive phase, while the coil elements 21c and 21d are individually driven in the negative phase. A magnetic field Hy in the longitudinal direction (Y-axis direction) parallel to the coil plane of the coil array 22 is generated near the coil array 22 by generating a magnetic field that is directed from the coil element 21a toward the coil element 21c and a magnetic field that is directed from the coil element 21b toward the coil element 21d.

Further, the magnetic field control element 24 divides the aforesaid four coil elements 21 (21a, 21b, 21c and 21d) between a set of coil elements 21a and 21b and a set of coil elements 21c and 21d that adjoin one another in the transverse direction (X-axis direction), and drives the coil elements 21 in each set out of phase. More specifically, in this example, the coil elements 21a and 21c are individually driven in the positive phase, while the coil elements 21b and 21d are individually driven in the negative phase. A magnetic field Hx in the transverse direction (X-axis direction) parallel to the coil plane of the coil array 22 is generated near the coil array 22 by generating a magnetic field that is directed from the coil element 21a toward the coil element 21b and a magnetic field that is directed from the coil element 21c toward the coil element 21d.

The magnetic field control element 24 serves selectively to generate the aforesaid magnetic field H (Hx, Hy or Hz) by controlling the respective polarities of the magnetic fields generated by means of the four coil elements 21 (21a, 21b, 21c and 21d), thereby changing the direction of the magnetic field H in the region (coupling region) near the coil array 22 to which the spherical semiconductor 10 is guided. The control of the directions of the generated magnetic fields by means of the magnetic field control element 24 will be mentioned later.

Figure 3:
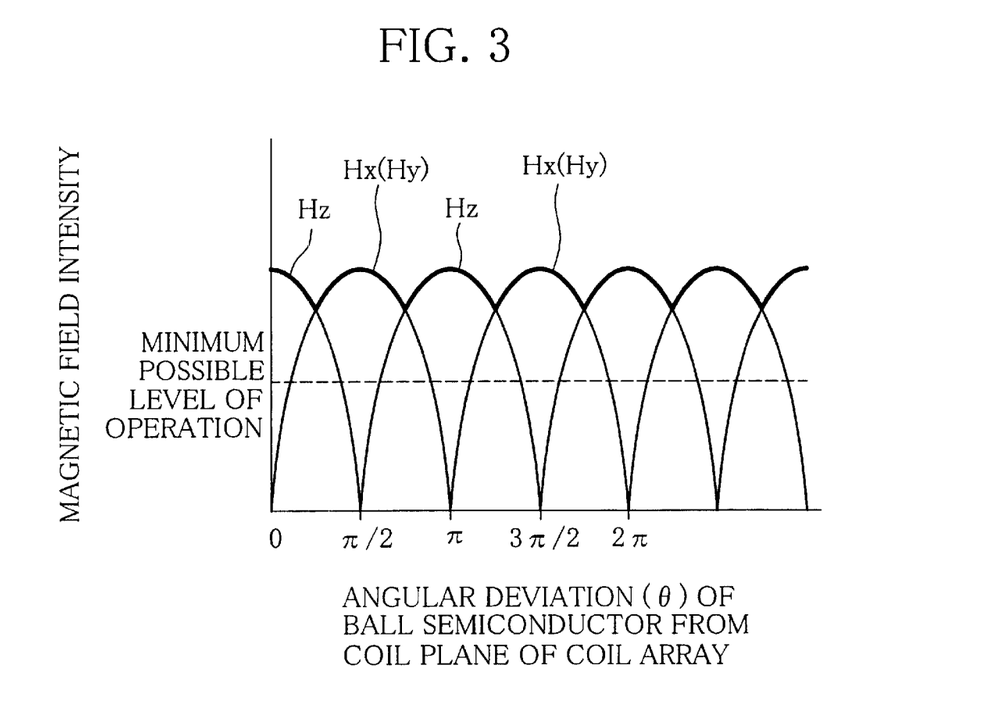
FIG. 3 is a diagram showing the change of the strength of electromagnetic-induction coupling of a spherical semiconductor and effects of the present invention, compared with an angular deviation between the axial direction of a coil on the spherical semiconductor and the coil plane of the coil array.

Thus, according to the electromagnetic-induction coupling apparatus constructed so that the direction of the magnetic field H in the region (coupling region) near the coil array 22 to which the spherical semiconductor 10 is guided is changed in this manner, the coil 11 can be strongly coupled to the magnetic field Hx, Hy or Hz in any direction by electromagnetic induction even in case the direction of the spherical semiconductor 10 that is guided to the coupling region, especially the axial direction of the coil 11 for use as an antenna on the surface of the spherical semiconductor 10, is not fixed, as shown in FIG. 1. In consequence, the strength of the electromagnetic-induction coupling with the coil 11 can be kept high if the direction of spherical semiconductor 10 (axial direction of the coil 11) is shifted with respect to the coil plane of the coil array 22, as shown in FIG. 3. Without regard to the posture of the spherical semiconductor 10, therefore, electric power can be steadily supplied to the spherical semiconductor 10, and the information signals can be steadily transmitted to and received from the spherical semiconductor 10.

Figure 4:
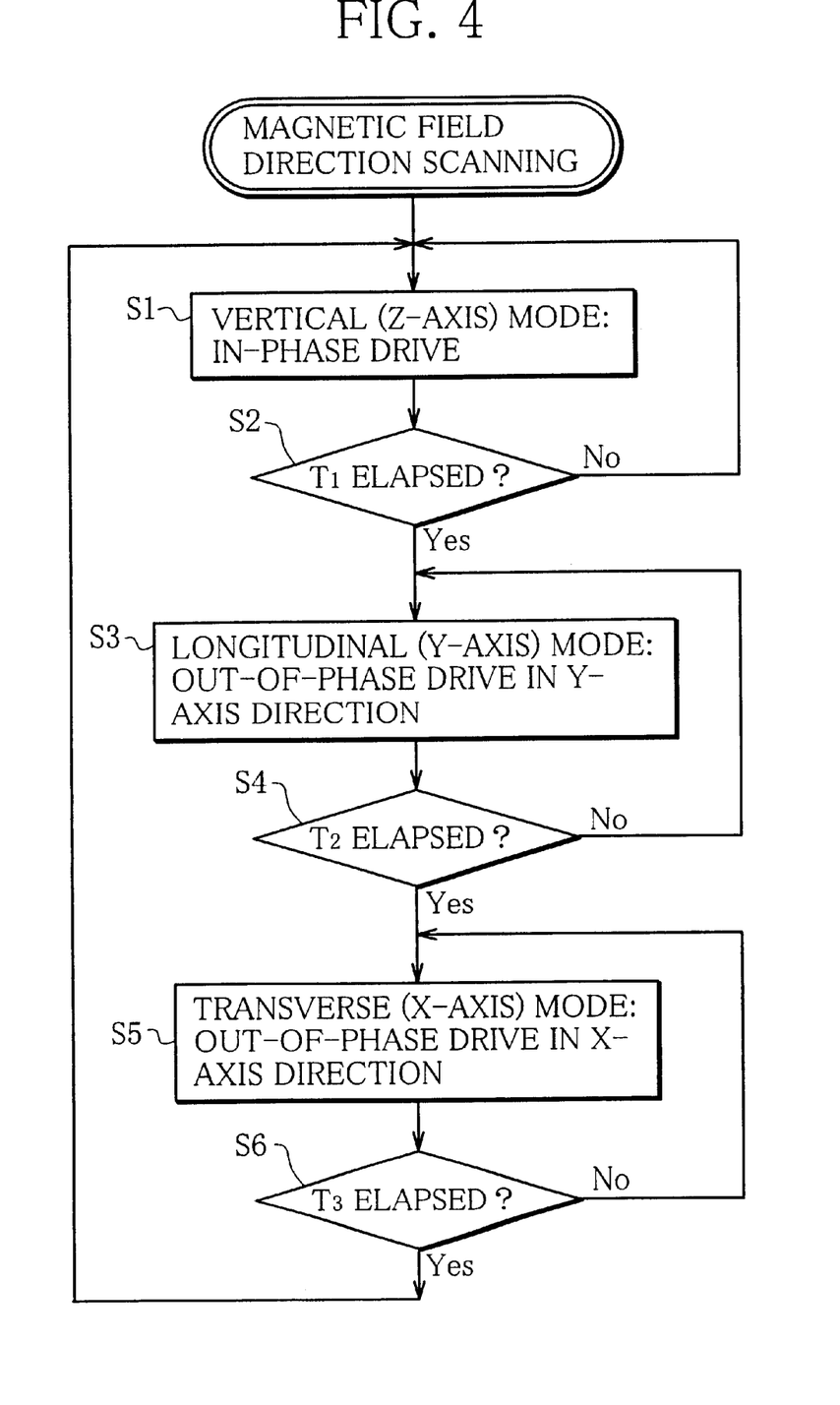
FIG. 4 is a chart showing steps of control procedure for changing the directions of magnetic fields in given cycles.

The following is a description of control for changing the directions of the generated magnetic fields by means of the magnetic field control element 24. This control is executed according to the steps of procedure shown in FIG. 4 or 5. The steps of procedure shown in FIG. 4 are based on control for successively changing the direction of the magnetic field H, in the magnetic field formed by means of the coil array 22, in given cycles. In this control, the four coil elements 21a, 21b, 21c and 21d are first driven in phase as a vertical (Z-axis) mode, for example, whereupon the magnetic field Hz that is perpendicular to the coil plane is generated (Step S1). The drive of the coil array 22 in this vertical mode is executed for a given period T1 (Step S2).

When the generation of the magnetic field Hz for the period T1 terminates, the aforesaid four coil elements 21a, 21b, 21c and 21d are then driven out of phase in the Y-axis direction as a longitudinal (Y-axis) mode, whereupon the magnetic field Hy in the Y-axis direction that is parallel to the coil plane is generated (Step S3). The drive of the coil array 22 in this longitudinal mode is executed for a given period T2 (Step S4). Likewise, thereafter, the aforesaid four coil elements 21a, 21b, 21c and 21d are driven out of phase in the X-axis direction as a transverse (X-axis) mode, whereupon the magnetic field Hx in the X-axis direction that is parallel to the coil plane is generated (Step S5). The drive of the coil array 22 in this transverse mode is executed for a given period T3 (Step S6).

By successively changing the modes with every period T1, T2 or T3 in this manner, the respective directions of the magnetic fields formed near the coil array 22 are changed cyclically in succession as the magnetic fields Hz, Hy and Hx, as mentioned before.

Figure 5:
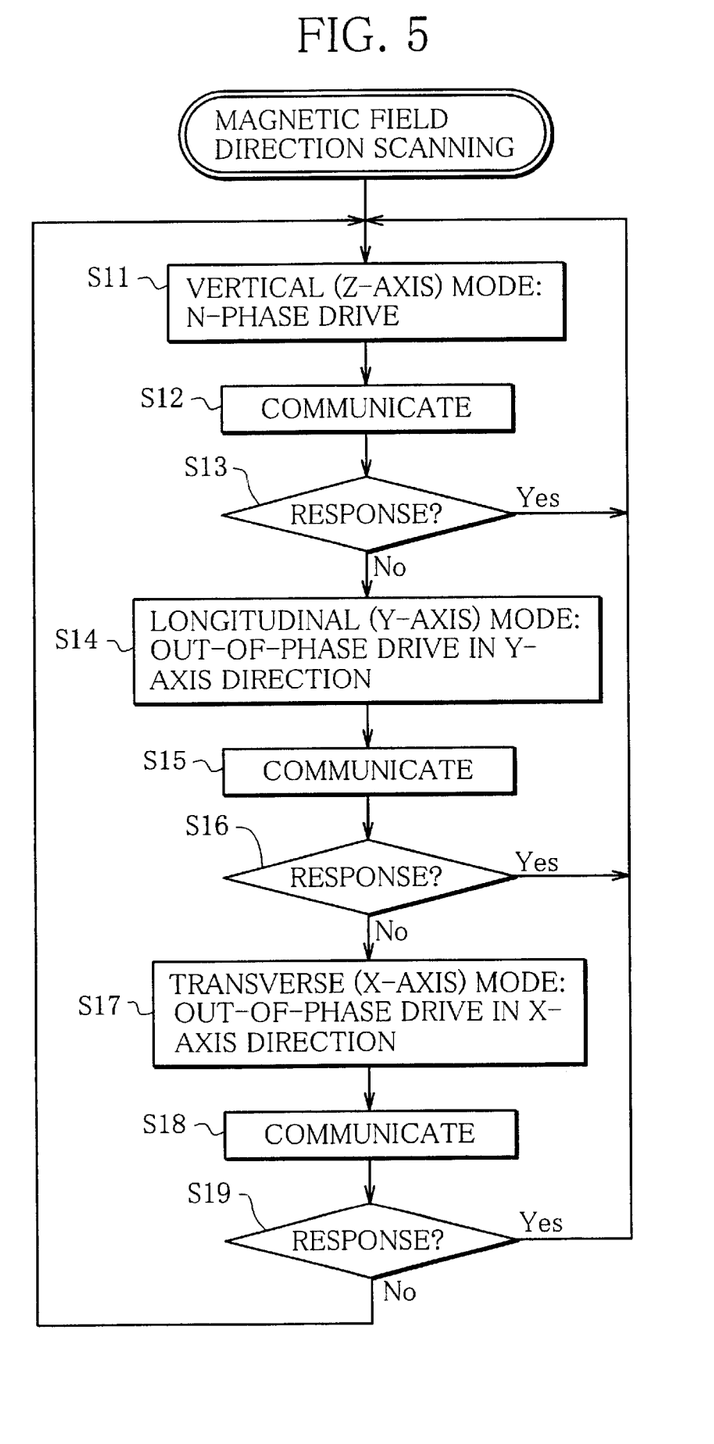
FIG. 5 is a chart showing steps of control procedure for changing the directions of the magnetic fields in accordance with the result of communication with the spherical semiconductor.

As in the steps of procedure shown in FIG. 5, predetermined communication with the spherical semiconductor 10 may be executed as the drive of the coil array 22 by means of the magnetic field control element 24 is controlled. More specifically, the aforesaid four coil elements 21a, 21b, 21c and 21d are driven in phase as the vertical (Z-axis) mode, for example, whereupon the magnetic field Hz that is perpendicular to the coil plane is generated (Step S11). With the magnetic field Hz thus generated from the coil array 22, predetermined communication with the spherical semiconductor 10 for performance check is executed (Step S12), and whether or not there is a predetermined response from the spherical semiconductor 10 is determined (Step S13). If there is the response from the spherical semiconductor 10, it is concluded that the spherical semiconductor 10 is supplied with electric power from the magnetic field Hz and operates normally so that the information signals can be transmitted and received steadily. In this case, the generated magnetic field Hz is maintained as transmission to and reception of the information signals from the spherical semiconductor 10 are executed.

If no response is obtained from the spherical semiconductor 10, on the other hand, it is concluded that the angular deviation between the direction of the magnetic field Hz and the axial direction of the coil 11 of the spherical semiconductor 10 is substantial and that the electromagnetic-induction coupling between the magnetic field Hz and the spherical semiconductor 10 is defective. In this case, the longitudinal (Y-axis) mode is set so that the coil elements 21a, 21b, 21c and 21d are driven out of phase in the Y-axis direction, whereupon the magnetic field Hy in the Y-axis direction that is parallel to the coil plane is generated (Step S14). With the magnetic field Hy thus generated from the coil array 22, as in the foregoing case of the vertical mode, predetermined communication with the spherical semiconductor 10 for performance check is executed (Step S15), and whether or not there is a predetermined response from the spherical semiconductor 10 is determined (Step S16). If there is the response from the spherical semiconductor 10, it is concluded that the spherical semiconductor 10 is supplied with electric power from the magnetic field Hy and operates normally so that the information signals can be transmitted and received steadily. In this case, the generated magnetic field Hy is maintained as transmission to and reception of the information signals from the spherical semiconductor 10 are executed.

If no response is obtained from the spherical semiconductor 10, it is concluded that the angular deviation between the direction of the magnetic field Hy, as well as the direction of the magnetic field Hz, and the axial direction of the coil 11 of the spherical semiconductor 10 is substantial and that the electromagnetic-induction coupling between the magnetic fields Hz and Hy and the spherical semiconductor 10 is defective. In this case, therefore, the transverse (X-axis) mode is set so that the coil elements 21a, 21b, 21c and 21d are driven out of phase in the Y-axis direction, whereupon the magnetic field Hx in the X-axis direction that is parallel to the coil plane is generated (Step S17). With the magnetic field Hx generated from the coil array 22, as in the foregoing cases, predetermined communication with the spherical semiconductor 10 for performance check is executed (Step S18), and whether or not there is a predetermined response from the spherical semiconductor 10 is determined (Step S19).

If there is the response from the spherical semiconductor 10, it is concluded that the spherical semiconductor 10 is supplied with electric power from the magnetic field Hx and operates normally so that the information signals can be transmitted and received steadily. The generated magnetic field Hx is maintained as transmission to and reception of the information signals from the spherical semiconductor 10 are executed. If no response is obtained from the spherical semiconductor 10 even with use of the magnetic field x, it is concluded, for example, that the spherical semiconductor 10 is not guided to the magnetic field generating region (region for coupling with the spherical semiconductor 10) near the coil array 22, that is, the spherical semiconductor 10 is not present, and the drive mode of the coil array 22 is restored to its initial state.

The same effect for the case of the aforesaid steps of control procedure shown in FIG. 4 can be also produced in a manner such that whether or not the electromagnetic-induction coupling between the magnetic field H in the magnetic field formed by means of the coil array 22 and the coil 21 on the spherical semiconductor 10 is secured is determined (Step S), and the direction of the magnetic field H is changed by changing the drive mode of the coil array 22 so that the electromagnetic-induction coupling can be established steadily.

Figure 6A:
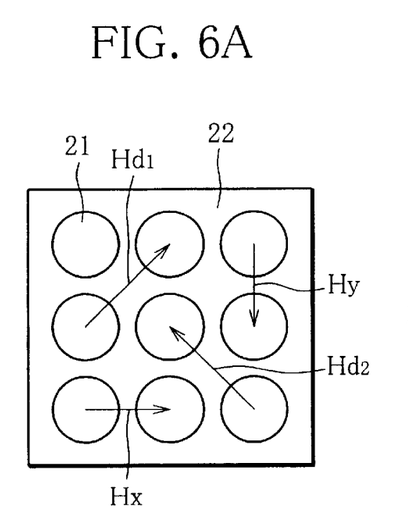
FIGS. 6A and 6B are diagrams showing examples of two-dimensional arrangements of a plurality of coil elements constituting a coil array.

The coil array 22 can be realized by using nine coil elements 21 in the form of an annular loop each, for example, as shown in FIG. 6(a). The direction of the magnetic field in the magnetic fields that are formed near the coil array 22 may be changed by alternatively driving all the coil elements 21 in phase or alternatively driving out of phase some of the coil elements 21 that adjoin one another in the X- or Y-axis direction. In this case, in particular, magnetic fields Hd1 and Hd2 that are inclined at 45 degrees to the X-axis and the Y-axis, respectively, can be also alternatively formed by driving the obliquely adjacent coil elements 21 out of phase, as illustrated in FIG. 6(a).

Figure 6B:
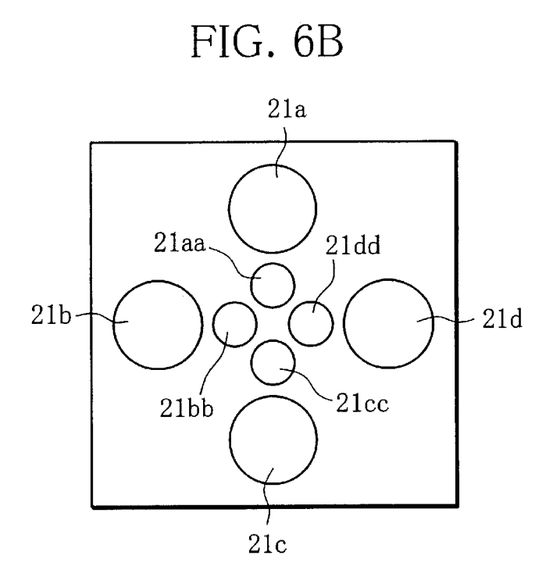

The example shown in FIG. 6(b) indicates a coil array 22 designed so that four small-diameter coil elements 21aa, 21bb, 21cc and 21dd are arranged inside four large-diameter coil elements 21a, 21b, 21c and 21d, respectively. These small-diameter coil elements 21aa, 21bb, 21cc and 21dd, which are driven in phase with the adjacent large-diameter coil elements 21a, 21b, 21c and 21d, respectively, serve to compensate for the lowering of the magnetic field intensity in the central portion of a magnetic field that is formed near the coil array 22 by means of the large-diameter coil elements 21a, 21b, 21c and 21d.

With use of the coil array 22 constructed in this manner, the intensity of the magnetic field H in the region near the coil array 22 to which the spherical semiconductor 10 is guided can be nearly fixed without regard to the direction of the magnetic field H. In other words, in the case where the coil array 22 is constructed using the four coil arrays 21a, 21b, 21c and 21d, as shown in FIG. 1, a space area without the coil elements 21 is formed in the central portion of the coil array 22, so that it is apprehended that the intensity of the magnetic field H in the central portion of the region for coupling with the spherical semiconductor 10 will become lower than in the peripheral portion. If the small-diameter coil elements 21aa, 21bb, 21cc and 21dd are arranged so that the central portion of the coil array 22 is embedded, with this regard, the magnetic field H in the central portion of the region for coupling with the spherical semiconductor 10 can be compensated, so that the intensity of the magnetic field in the whole coupling region can be nearly fixed. In consequence, steady electric power supply and transmission and reception of the information signals can be carried out without regard to the posture of the spherical semiconductor 10.

Figure 7:
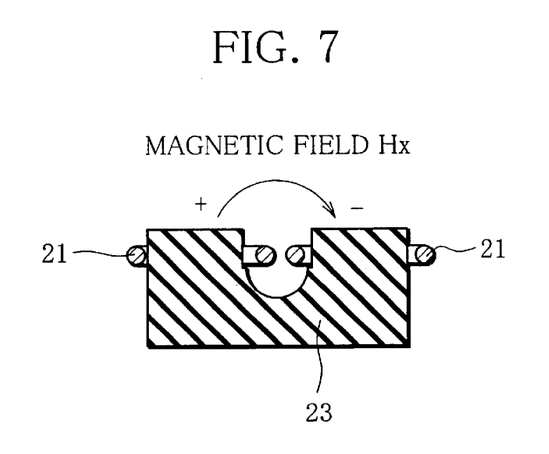
FIG. 7 is a sectional view showing the construction of a coil array provided with a core.

Further, a plurality of coil elements 21 may be arranged with the aid of a core 23, as shown in FIG. 7 that schematically illustrates the profile thereof. With use of this core 23, magnetic fields generated by means of the coil elements 21 can be prevented from leaking in unexpected directions, that is, to the reverse side. Thus, the efficiency of generation of the magnetic field H can be improved, and the intensity of the magnetic field H in the region for coupling with the spherical semiconductor 10 can be increased with ease.

Figure 8A:
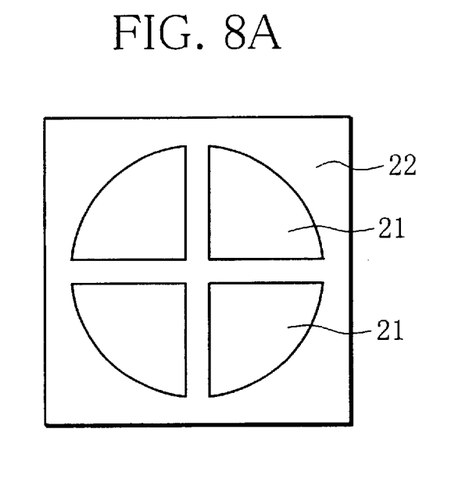
FIGS. 8A and 8B are diagrams showing modifications of the shape of a plurality of coil elements constituting a coil array and examples of their two-dimensional arrangement.
Figure 8B:
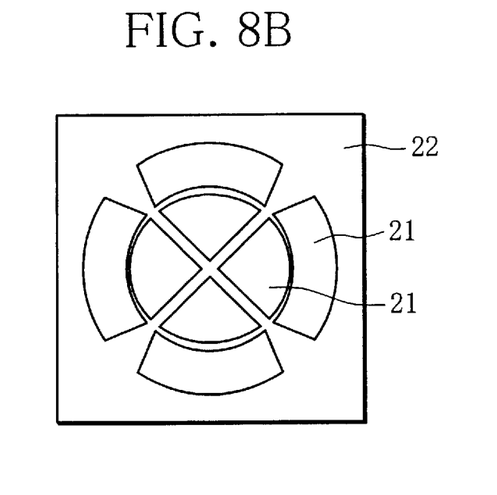

It is effective, furthermore, to realize the coil elements 21 as fan-shaped loop antennas the coil opening dimensions gradually increase from the central portion of the coil array 22 toward its peripheral portion, as shown in FIGS. 8(a) and 8(b). With use of the fan-shaped coil elements 21, malfunction that is caused when the annular coil elements 21 are used, e.g., lowering of the intensity of the magnetic field H in the central portion of the coil array 22, can be eliminated.

Figure 9:
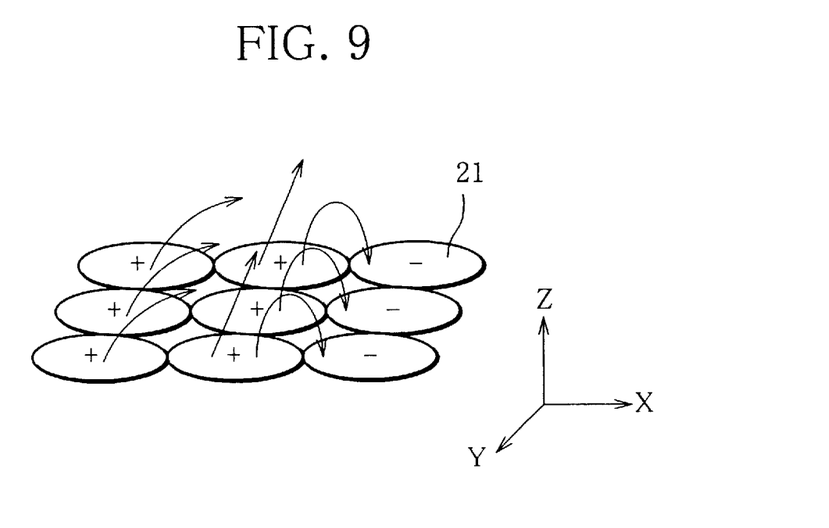
FIG. 9 is a diagram showing an example of the way magnetic fields inclined at a given angle to the coil plane of the coil array are generated.

As is illustrated in FIG. 9, moreover, the respective directions of the magnetic fields formed near the coil array 22 may be changed by differentiating the number of the coil elements 21 that are driven in the positive phase from the number of the coil elements 21 that are driven in the negative phase. More specifically, if the coil elements 21 in the left-hand and central columns are driven in the positive phase and the coil elements 21 in the right-hand column in the negative phase, the magnetic fields are deflected in circular arcs that are directed form the left-hand side or center to the right-hand side. Thus, the respective directions of the magnetic fields near the coil array 22 can be inclined with respect to the coil plane of the coil array 22. In consequence, a magnetic field Hθ that is inclined at a given angle to the coil plane, as well as the aforesaid magnetic field Hz that is perpendicular to the coil plane and the magnetic fields Hx and Hy that are parallel to the coil plane, can be formed, so that the magnetic field directions can be changed more diversely.

Described above is an example in which the respective polarities of the magnetic fields generated by means of the coil elements 21 in the predetermined sets are controlled to be changed positively and negatively. Alternatively, however, the respective directions of the magnetic fields that are formed near the coil array 22 may be freely changed by changing the respective drive phases of the coil elements 21. It is to be understood, therefore, the magnetic field directions may be continuously changed by successively driving the coil elements 21 with given phase differences. In short, it is necessary only that the respective directions of the magnetic fields that are formed by means of the coil array 22 be changed by selectively controlling the respective drive phases of the coil elements 21 in accordance with the number of the coil elements 21 in the coil array 22 and their arrangement patterns and suitably on-off-controlling the drive.

The present invention is not limited to the embodiment described above. For example, the coil array 22 may be realized in a manner such that patterns that individually constitute a plurality of coil elements 21 are formed by etching a conductor layer such as a copper foil that is formed on an insulating substrate. In this case, the number of turns of the coil elements 21 can be also increased by stacking a plurality of conductor layers by laminate molding with insulating layers between them and serially connecting the coil patterns that are stacked in layers in their thickness direction. Further, the coil elements 21 can be formed on both surfaces of the insulating substrate.

If a material such as alumina having high heat conductivity is used for the substrate that forms the coil elements 21, as this is done, heat generated from each coil element 21 can be radiated quickly. Even in the case of high power transmission, therefore, temperature increase of the coil array 22 can be restrained to prevent disconnection of the coil elements 21 or the like. The effect of heat radiation can be further enhanced if a plastic agent in which powder with high heat conductivity is dispersed is used as an adhesive agent for fixing the coil elements 21 to the substrate.

It is necessary only that the number of the coil elements 21 that constitute the coil array 22 and their arrangement patterns and the configuration of the each coil element 21 itself be set according to the specifications. Further, the drive control of these coil elements 21 only requires successive changing of the direction of the magnetic field H in the coupling region near the coil array 22 to which the spherical semiconductor 10 is guided, and the sequence control of the direction of the magnetic field H is not limited in particular. According to the aforesaid arrangement, moreover, a plurality of coil elements 21 are driven in phase or out of phase. It is to be understood, however, that the direction of the generated magnetic field H can be continuously changed by changing the drive phases of the coil elements. It is to be understood, moreover, that the coil elements 21 that are arranged unsymmetrically may be selectively driven so that the direction of the magnetic field can be changed at random. The present invention may be carried out in any other manners without departing from its scope or spirit.

INDUSTRIAL APPLICABILITY

According to the present invention, as described above, the coil array is used in which a plurality of coil elements are two-dimensionally arranged with their respective coil planes flush on a given plane, and the polarity or phase for driving the coil elements 21 is controlled. Therefore, the direction of the magnetic field in the magnetic fields formed in the region near the coil array to which the spherical semiconductor is guided can be changed with ease. In consequence, even if the posture of the spherical semiconductor is not fixed, electric power can be steadily supplied to the spherical semiconductor with use of a magnetic field in the direction corresponding to the posture, and the information signals can be securely transmitted to and received from the spherical semiconductor. Thus, the electromagnetic-induction coupling apparatus can be realized as a suitable feeder system for the spherical semiconductor and a data communication system for communication with the spherical semiconductor.

What is claimed is:

1. An electromagnetic-induction coupling apparatus for supplying electric power to a spherical semiconductor (10) having a coil (11) on the surface thereof by electromagnetic-induction coupling by means of said coil and/or transferring information signals to and from said spherical semiconductor through said coil, comprising:

a coil array (22) including a plurality of coil elements (21) two-dimensionally arranged on a given plane; and a magnetic field control element (24) for controlling the respective polarities and phases of magnetic fields generated by means of said individual coil elements of the coil array, thereby changing the respective directions of magnetic fields in a region near said coil array to which said spherical semiconductor is guided.

2. An electromagnetic-induction coupling apparatus according to claim 1, wherein said magnetic field control element successively changes in given cycles the directions of the magnetic fields in the region near said coil array to which said spherical semiconductor is guided.

3. An electromagnetic-induction coupling apparatus according to claim 1, wherein said magnetic field control element monitors a response from said spherical semiconductor, and changes the directions of the magnetic fields in the region near said coil array to which said spherical semiconductor is guided when no response is obtained from said spherical semiconductor in a given period.

4. An electromagnetic-induction coupling apparatus according to claim 1, wherein said magnetic field control element drives a plurality of coil elements of said coil array in phase, thereby generating a magnetic field perpendicular to the plane on which said plurality of coil elements are two-dimensionally arranged, in the region near said coil array to which said spherical semiconductor is guided, and drives the coil elements in predetermined sets of said coil array out of phase, thereby generating a magnetic field parallel to or inclined with respect to the plane on which said plurality of coil elements are two-dimensionally arranged, in the region near said coil array to which said spherical semiconductor is guided.

5. An electromagnetic-induction coupling apparatus according to claim 1, wherein said coil array includes a plurality of coil elements symmetrically arranged in the longitudinal and transverse directions on said given plane.

* * * * *